United States Patent
Hsu et al.

(10) Patent No.: US 6,768,715 B2
(45) Date of Patent: Jul. 27, 2004

(54) APPARATUS, AND ASSOCIATED METHOD, FOR PERFORMING REVERSE-LINK TRAFFIC MEASUREMENTS IN A RADIO COMMUNICATION SYSTEM

(75) Inventors: Liangchi Hsu, San Diego, CA (US); Mark W. Cheng, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/284,601

(22) Filed: Oct. 31, 2002

(65) Prior Publication Data

US 2003/0227869 A1 Dec. 11, 2003

Related U.S. Application Data

(60) Provisional application No. 60/386,815, filed on Jun. 7, 2002.

(51) Int. Cl.[7] ............................ G01R 31/08; G06F 11/00
(52) U.S. Cl. ........................ 370/229; 370/236; 370/252; 370/335
(58) Field of Search ................................ 370/229, 230, 370/230.1, 231, 232, 234, 235, 236, 236.1, 236.2, 252, 253, 328, 329, 335, 342, 441, 479, 331, 412, 431, 468

(56) References Cited

U.S. PATENT DOCUMENTS

| | | | |
|---|---|---|---|
| 2002/0027889 A1 | * | 3/2002 | Yun et al. .................... 370/331 |
| 2002/0114280 A1 | * | 8/2002 | Yi et al. ...................... 370/235 |
| 2003/0067897 A1 | * | 4/2003 | Black ......................... 370/335 |
| 2003/0112762 A1 | * | 6/2003 | Hasan Mahmoud et al. .......................... 370/252 |

* cited by examiner

*Primary Examiner*—Brian D Nguyen (57) ABSTRACT

Apparatus, and an associated method, for generating a TVMAR (traffic volume measurement and reporting) report, or other appropriate report, to facilitate packet scheduling in a packet-based communication system. A signal is generated at a network part of a radio communication system indicative of parameters that the mobile station is to include in the TVMAR report, subsequently to be generated by the mobile station. The signal is generated by a signal generator and sent to the mobile station to be detected thereat by a detector. The communication indicia is measured by a measurer and the measured values of the selected parameters are formed into a TVMAR report and returned to the network part.

20 Claims, 4 Drawing Sheets

APPARATUS, AND ASSOCIATED METHOD, FOR PERFORMING REVERSE-LINK TRAFFIC MEASUREMENTS IN A RADIO COMMUNICATION SYSTEM

CROSS-REFERENCE TO RELATED APPLICATIONS

The present application claims the benefit of provisional patent application No. 60/386,815, filed on Jun. 7, 2002.

The present invention relates generally to a manner by which to provide information to facilitate scheduling of packet data communications in a cellular, or other radio, communication system, such as a cdma2000 system. More particularly, the present invention relates to apparatus, and an associated method, by which to facilitate reverse-link traffic measurement reporting, such as TVMAR (traffic volume measurement and reporting) reports generated at a mobile station, to be used to schedule communication of packet data to the mobile station to effectuate a communication service therewith.

The reports provide information, in a timely manner, to permit the packet data scheduling to be performed. And, the report also forms a data-rate request to request a selected data rate at which the packet data is communicated pursuant to the data service. Parameters contained in the report are selected at the network part of the communication system. And, the selected parameters are communicated to the mobile station, causing the mobile station to report with the values of the selected parameters in a timely manner so that the reported values can be used in the data scheduling.

BACKGROUND OF THE INVENTION

A communication system operates to communicate data between two, or more, communication stations. A communication system is formed, at a minimum, of a first communication station, forming a sending station, and a second communication station, forming a receiving station. The communication stations are interconnected by way of a communication channel. And, data that is to be communicated by the first communication station to the second communication station is sent to the second communication station by way of the communication channel. The data that is to be communicated is converted by the first communication station into a form to permit its communication upon the communication channel. And, the second communication station operates to detect the data communicated thereto and to recover the informational content thereof.

Many different types of communication systems have been developed and implemented to effectuate the communication of the data between the communication stations. And, with continued advancements in communication technologies, new types of communication systems, as well as improvements to existing communication systems, have been, and continue to be, made.

A radio communication system is an exemplary type of communication system. A radio communication system utilizes radio communication channels upon which to communicate the data that is to be communicated between the communication stations operable therein. Radio communication channels are defined upon radio links forming part of the electromagnetic spectrum. As a radio link is utilized upon which to define the communication channels, the need otherwise to utilize wireline connections upon which to define communication channels is obviated. Implementation of a radio communication system is generally less costly than the corresponding costs that would be required to construct a conventional, wireline communication system. And, a radio communication system can be implemented to form a mobile communication system.

A cellular communication system, exemplary of a radio communication system, has been widely implemented and has achieved wide levels of usage. A cellular communication system provides for radio communications with mobile stations. The mobile stations permit telephonic communication to be effectuated therethrough. A cellular communication system includes a network part that is installed throughout a geographical area and with which the mobile stations communicate by way of radio channels. Base transceiver stations, forming portions of the network part of the communication system, are installed at spaced apart locations throughout the geographical area that is to be encompassed by the communication system. Each of the base transceiver station defines a cell, formed of a portion of the geographical area. When a mobile station is within the cell defined by a base transceiver station, communications are generally effectuable with the base transceiver station that defines the cell.

As a mobile station travels between cells defined by different ones of the base transceiver stations, communication handoffs are effectuated to permit continued communications by, and with, the mobile station. Through appropriate positioning of the base transceiver stations, only relatively low-powered signals need to be generated to effectuate communications between a mobile station and a base transceiver station. Hand-offs of communications between successive base transceiver stations, as the mobile station moves between cells permit the continued communications without necessitating increase in the power levels at which the communication signals are transmitted. And, because only relatively low-powered signals need to be generated to effectuate communications, the same radio channels can be reused at different locations of the same cellular communication system. Efficient utilization of the frequency-spectrum allocation to the cellular communication system is thereby possible.

Various operating specifications have been promulgated that define operational parameters by which cellular, as well as other, communication systems are to be operable. Successive generations of cellular communication systems, incorporating technological advancements, as such advancements become available, have been defined by successive generations, or updates to, operational specifications. First-generation and second-generation systems have been widely implemented and have achieved significant levels of usage. And, installation of third-generation and successor-generation systems have been proposed. An exemplary operating specification, referred to as the cdma2000 specification, sets forth the operating parameters of an exemplary, third-generation communication system. The cdma2000 operating specification, as well as other third-generation operating specification, provides for packet-based, data communication services.

To effectuate such packet-based data services, a packet scheduler that schedules the communication of the data packets to effectuate the communication service is utilized. To schedule properly the communication of the data packets, the scheduler must receive indications of communication conditions upon the radio channels upon which the packet data is to be communicated. In a proposal for the cdma2000 operating specification, a reverse link traffic volume and measurement and reporting (RL-TVMAR) report is specified, e.g., 3GPP specification, document No. TS 25.331 [1]. The purpose for the traffic measurements and reporting is to perform efficiently reverse link packet data scheduling by the scheduler at the network part of the communication system.

Feedback information includes, for instance, a buffer status of a buffer at the mobile station at which packet data is buffered, prior to its transmission. And, information also includes reverse-link activity indications.

Existing TVMAR-report proposals are deficient in several regards. The existing proposals generally provide for 1-bit status reports, to be communicated variously, upon a dedicated channel, a common channel, or a time-multiplexed subchannel, along with another reverse channel. Such single-bit status report is to be reported, variously by way of a per radio frame basis or an on-demand basis.

The single-bit status report provides only very limited information, both prospectively and historically. And, the existing proposals set forth the communication of the single-bit status report on an unsolicited basis. If the status report is sent at a time during which the network part cannot properly make use of the report, the status report is of, essentially, no utility. And, the measurement format, measurement period, and reporting triggers are not necessarily based upon network-part determinations, thereby limiting the optimality of the system efficiency.

An improved reporting mechanism for providing a resource manager, such as a packet scheduler, with TVMAR, and other analogous reports, would therefore be advantageous.

It is in light of this background information related to packet-based communication services in an advanced-generation cellular, or other radio, communication system, that the significant improvements of the present invention have evolved.

SUMMARY OF THE INVENTION

The present invention, accordingly, advantageously provides apparatus, and an associated method, by which to provide information to facilitate scheduling of packet data communicated in a cellular, or other radio, communication system.

Through operation of an embodiment of the present invention, reverse-link, traffic measurement reporting is facilitated. Reports, such as TVMAR (traffic volume measurement and reporting) reports, generated at a mobile station are used to schedule communication of packet data with the mobile station to effectuate a communication service therewith.

Timely reports are generated that provide information to permit the packet data scheduling to be performed. The report also forms a data-rate request to request a selective data rate at which the packet data is communicated pursuant to the data service. Parameters contained in the report are selected at the network part of the communication system. The selected parameters are communicated to the mobile station, causing the mobile station to report with the values of the system parameters in a timely manner so that the reported values can be used in the data scheduling.

In one aspect of the present invention, the network part of the radio communication system selects the parameters that are to be contained in a TVMAR report, subsequently to be used to schedule packet-based communication services with a mobile station. Because the determination is made at the network part as to what parameters shall be contained in the TVMAR report, the information required to determine best the packet scheduling in an optimal manner is better assured.

In another aspect of the present invention, when the parameters, values of which are to be contained in the TVMAR report, subsequently to be generated, are determined, a signal is formed, indicating the parameter-types. The signal is sent by the network part to the mobile station, to be detected thereat. In one implementation in which the signal forms a higher layer, layer-three (L3), a binary large object block (BLOB). The BLOB is communicated by way of a radio channel to the mobile station.

In another aspect of the present invention, the mobile station detects the signal sent thereto by the network part and extracts therefrom indications of the parameters that are to be contained in the TVMAR report, subsequently to be generated by the mobile station. The mobile station operates, responsive thereto, to measure, or otherwise obtain, values of the selected parameters. The values measured, or otherwise obtained by the mobile station, are used to populate a TVMAR report that is generated and returned to the network part of the communication system. Once received at the network part, the values contained in the TVMAR are used to perform packet scheduling to schedule packet data communications to effectuate the communication service with the mobile station.

In another aspect of the present invention, the cdma2000 system is defined in terms of protocol layers. The link layer includes an RLP (radio link protocol) layer. At the RLP layer, RLP buffer status information and statistics are obtainable. Statistics measured at the RLP layer are used to form the TVMAR report at the mobile station that is communicated to the network part of the communication system to be used thereat for packet scheduling purposes.

The TVMAR report is generated, for instance, at selected intervals or responsive to a triggering condition. When generated responsive to triggering conditions, the report is, for instance, generated at selected time period subsequent to the occurrence of the triggering event.

In another aspect of the present invention, the TVMAR report is selectably of a differential report-type or of a full report-type. The full report is a multi-bit report containing statistical and status values measured by the mobile station. And, a differential report is of a reduced number of bits, e.g., a single bit value, indicating a difference indication of status values relative to prior reports. The differential report is interpreted as an up, down, or constant value.

Because the values reported by the mobile station are of parameters requested by the network part of the communication system, the information is more likely to be appropriate for the scheduling of the packet data communications. And, when the report is generated responsive to the request of the network part, the report is more likely to be delivered to the network part during a time period in which the network part is able to make proper use of the values contained in the report.

In these and other aspects, therefore, apparatus, and an associated method, is provided for a radio communication system. The radio communication system has a mobile station operable to communicate with a network part of the communication system. Communication indicia associated with the mobile station is reported by the mobile station to the network part pursuant to a high-data-rate communication service. A communication indicia parameter detector detects network-provided communication indicia parameters sent to the mobile station. A communication indicia measurer is coupled to the communication indicia parameter detector. The communication indicia measurer measures values of the communication indicia identified by the network-provided communication-indicia parameters sent to the mobile station and detected by the communication indicia parameter detector. A communication indicia reporter is coupled to the communication indicia measurer. The communication indicia reporter reports values, measured by the communication indicia measurer, to the network part.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
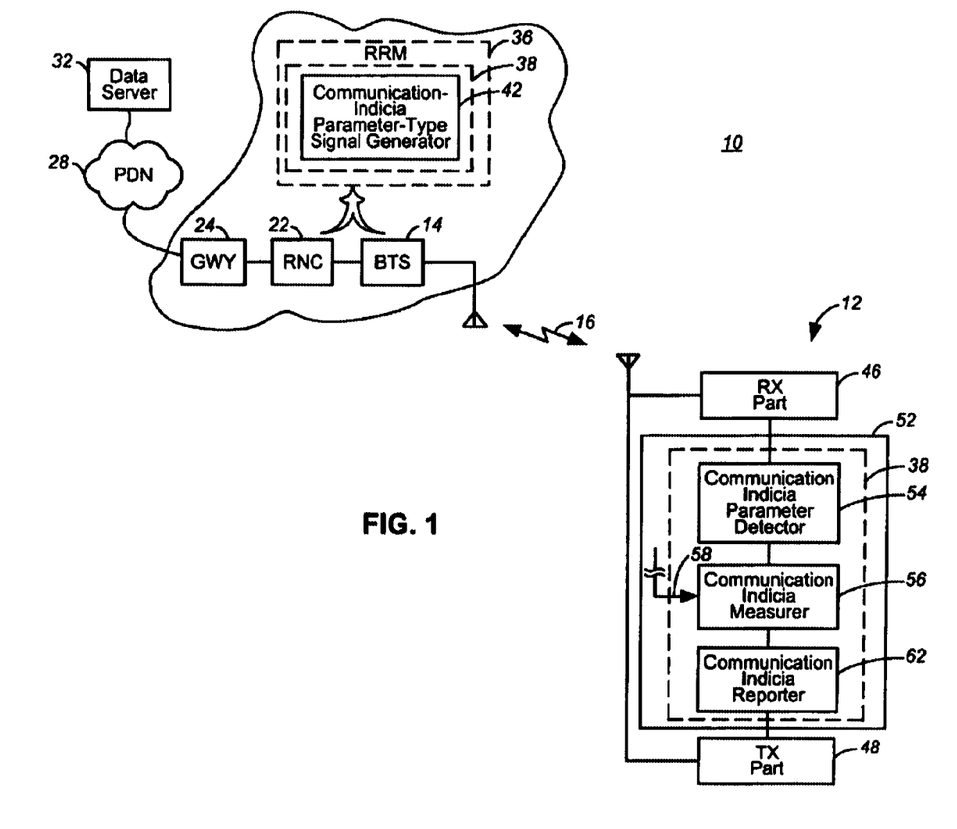
FIG. 1 illustrates a functional block diagram of a communication system in which an embodiment of the present invention is operable.

Referring first to FIG. 1, a communication system, shown generally at 10, provides for radio communications with mobile stations, of which the mobile station 12 is representative. The communication system includes a network part, having inter alia, a radio part that includes a plurality of fixed-site base transceiver stations, of which the base transceiver station 14 is representative. A base transceiver station and mobile station are interconnected by way of radio channels defined upon a radio link, here designated at 16. Forward link channels are defined upon which data is communicated by the base transceiver station to the mobile station. And, reverse link channels are defined upon which data is communicated by the mobile station to the base transceiver station.

In the exemplary implementation shown in the figure, the communication system 10 forms a cellular communication system, generally operable pursuant to a proposed cdma2000 operational specification. A communication system implemented pursuant to the standard specification provides for high-data rate communication services, such as 1×EV-DV communication services. In other implementations, other types of data services, for example, 1XTREME and 1×EV-DO data services are instead provided.

The communication system 10 is also representative of other types of packet radio communication systems. Accordingly, while the following detailed description shall describe operation of an embodiment of the present invention with respect to its implementation in a cdma2000 system that provides for 1×EV-DV data communication services, the present invention is analogously also implementable in cellular, and other, communication systems operable pursuant to other communication schemes.

Packet-based data communication services are effectuable with the mobile station 12, as well as other mobile stations operable in the communication system. To effectuate efficiently the data communication service, packet scheduling is required to schedule the communication of the data packets to effectuate the communication service. To schedule the data packet communication properly, information is required, for instance, of a buffer status at the mobile station at which data is buffered during effectuation of the communication service.

The radio part of the network portion of the communication system includes a radio network controller (RNC) 22 coupled to the base transceiver station. The radio network controller operates to perform control functions controlling operations in the radio part of the communication system. The radio network controller, in turn, is coupled to a gateway (GWY) 24. The gateway 24 forms a gateway that connects the radio part of the communication system with a fixed network, here a packet data network (PDN) 28. Data sources, such as a data server 32 are coupled to the network 28 and provide a data source from which data that is to be communicated to the mobile station pursuant to a data service is sourced. Through the formation of a communication path between the data server and the mobile station 12, data packets into which the data is formatted are communicated to the mobile station.

The radio part of the communication system also includes a radio resource manager 36 embodied at the radio network controller for the base transceiver station, or distributed therebetween. The radio resource manager includes the apparatus 38 of an embodiment of the present invention. The apparatus 38 forms a communication-indicia, parameter-type signal generator 42. The signal generator 42 operates to form a signal for communication to the mobile station. The signal generated by the signal generator indicates the parameters that are to be measured, or otherwise obtained, by the mobile station for subsequent inclusion in a TVMAR (traffic volume measurement and reporting) report generated at the mobile station. Because the radio resource manager identifies the parameters that are to be contained in a subsequently-generated TVMAR report, the information required by the radio resource manager, or other functional structure, of the communication system, that performs the packet scheduling is likely to be contained in the TVMAR, or other appropriate, report. Once generated, the signal generated by the signal generator 42 is transmitted by the base transceiver station upon a forward link channel defined upon the radio link 16.

The mobile station includes transceiver circuitry, here indicated by a receive part 46 and a transmit part 48. The mobile station also includes a controller 52 that contains apparatus 38 of an embodiment of the present invention. The apparatus 38 includes functional elements, implementable in any desired fashion, such as by algorithms executable by processing circuitry.

The apparatus includes a communication indicia parameter detector 54 coupled to the receive part 46. The detector operates to detect delivery at the receive part of the mobile station of the signal generated by the signal generator 42. Indications of the parameters detected by the detector are provided to a communication indicia measurer 56. The communication indicia measurer operates to measure values of the parameters detected by the detector 54. Measurement is made, for instance, based upon additional signals received at the receive part 46. The line 58 is representative of the connection of the measurer to the receive part.

The apparatus 38 further includes a communication indicia reporter 62, coupled to the measurer 56 to receive indications of the measurements made thereat. The reporter operates to generate the TVMAR, or other, report containing the values measured by the measurer 56 of the parameters contained in the signal generated by the signal generator 42. The TVMAR report is communicated by way of a reverse-link channel defined upon the radio link 16, to the base transceiver station 14. The values contained in the TVMAR report are used to perform packet scheduling to schedule packet-data communications to effectuate a packet-based communication service with the mobile station.

The parameters selected by the signal generator 42 is of any of various parameter-types, e.g., an instantaneous transmit buffer usage (per each data service instance), e.g., SR_ID, average transmit buffer usage at the mobile station, e.g., per each data service instance, and the transmit buffer usage variance are all parameters that are selectable by the signal generator 42 to be requested to be contained in the TVMAR report. Additionally, a time interval required to measure average transmit buffer usage and transmit buffer usage variance of the buffer of the mobile station also selectably forms a parameter to be measured.

Additional parameters include, for instance, TVMAR reporting trigger types, periodic or event/threshold-based triggers buffer size threshold values, e.g., low and high threshold values, the duration/period of full TVMAR reporting in differential TVMAR reporting the TVMAR report-type, and a TVMAR report-identification (ID) are all parameters, values of which the signal generator selectably instructs the mobile station to populate a TVMAR report with.

Figure 2:
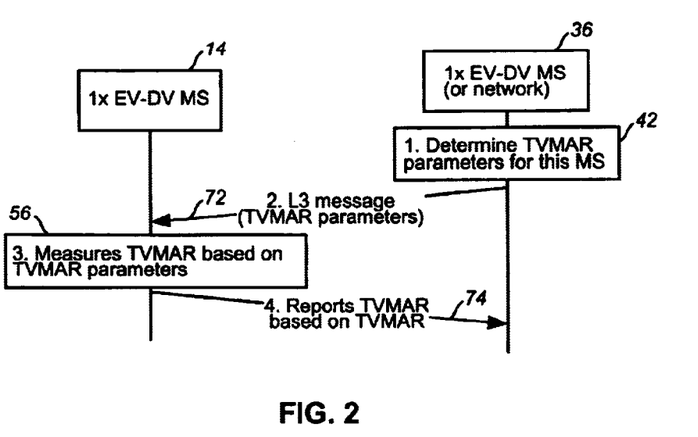
FIG. 2 illustrates a message sequence diagram representative of signaling generated during operation of an embodiment of the present invention.

FIG. 2 illustrates a message sequence diagram representative of signaling generated during operation of the apparatus 38 forming part of the communication system 10, shown in FIG. 1. Here, in the exemplary implementation, the communication-indicia parameter-type signal generator 38 is embodied at the radio resource manager 36. The mobile station is identified at 1×EV-DV MS. and the resource manager is identified at 1×EV-DV network. And, as indicated by the block 42, a determination is made of the TVMAR parameters that the mobile station shall be requested to obtain and to populate in a TVMAR report. A signal is generated by the signal generator and sent, here indicated by the segment 72, to the mobile station. In the exemplary implementation, the parameter-type signal is generated as a 1×EV-DV layer-3 (L3) message. In another implementation, the signal is formatted in a cdma2000 QOS_BLOB (binary large object block) signal as defined in an IS-707 specification or, alternately, a newly-specified, TVMAR-parameter-BLOB on the forward link channel. The formatting of an L3 message is, for instance: (modified) extended supplemental channel assignment message; UHDM; the broadcast message (with system parameters); and any other appropriate messages.

When delivered to the mobile station and detected by the detector thereof, the communication indicia measurer 56 measures values of the parameters contained in the signal delivered to the mobile station. Once measurements are made, the communication indicia reporter generates a report signal that is caused to be returned, here indicated by the segment 74, to the network part of the communication system. The report signal is generated at selected intervals or responsive to detection of a select triggering event.

Figure 3:
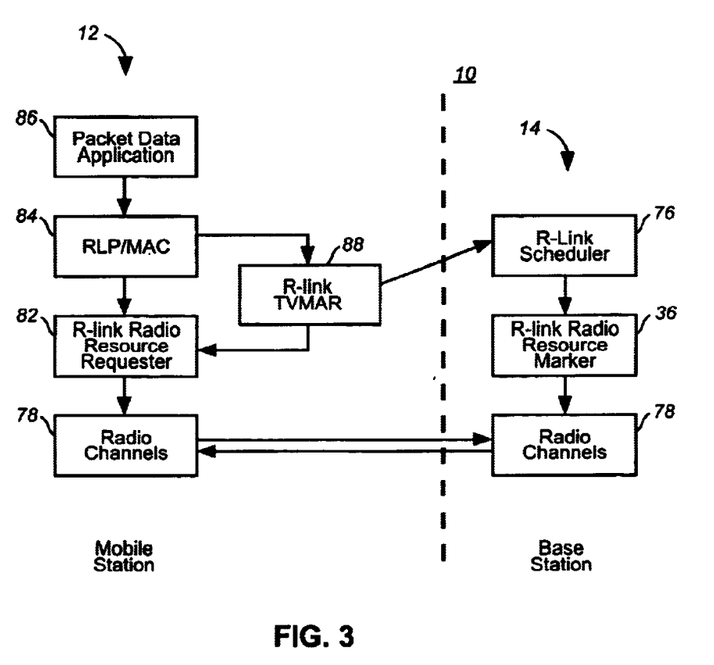
FIG. 3 illustrates a protocol layer representation of the communication system shown in FIG. 1, here also representative of an embodiment of the present invention.

FIG. 3 illustrates the communication system 10 in terms of protocol layers. The radio part 16 of the network portion of the communication system is defined in terms of protocol layers including a reverse-link scheduler 76 that operates to schedule the packet data communications with the mobile station. And, positioned beneath the scheduler 76 is the reverse-link radio resource manager 36. And, radio channels 78 forming the physical layer are positioned beneath the radio resource manager.

The mobile station 12 also includes a physical layer formed of the radio channel 78. A reverse-link radio resource manager 82 is positioned thereabove. And, a reverse-link protocol/medium access control (RLP/MAC) layer 84 is positioned above the resource requester. A packet data application layer 86 is positioned thereabove. The mobile station here also is indicated to include a reverse-link TVMAR layer 88.

The RLP/MAC layer 84 forms the "middle wear" of the packet data application and of the radio resource entity. The transmit buffer status and statistics are representative of the reverse-link traffic volume. In addition, the RLP/MAC entity is close enough to the radio resource entity so that buffer measurements and reporting cause minimal impact to the performance of the mobile station.

As noted previously, the transmit buffer measurement to be measured at the mobile station includes, amongst others, the instantaneous buffer usage, the average buffer usage, and the buffer usage variance.

The report in quantities are formatted, for instance, in m*step_size wherein m is a multiplier value and step_size is a selected step quantity of buffer size. For instance, if step_size is of a value of 16 kbps, when the instantaneous buffer usage is reached at 64 kbps, the mobile station reports that m equals 4.

Figure 4:
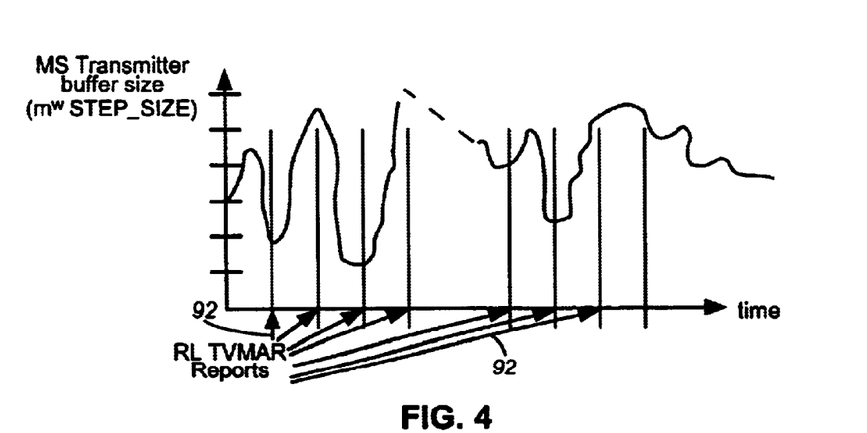
FIG. 4 illustrates a representation of report values generated during operation of an embodiment of the present invention when the reports are generated at periodic, or other selected, intervals.

FIG. 4 illustrates a representation of the number of packets buffered at the mobile station as a function of time. The number of packets, as indicated, vary as a function of time, here in an exemplary manner. The TVMAR reports generated by the mobile station are generated at selected intervals, here periodic intervals, indicated by the segments 92.

Figure 5:
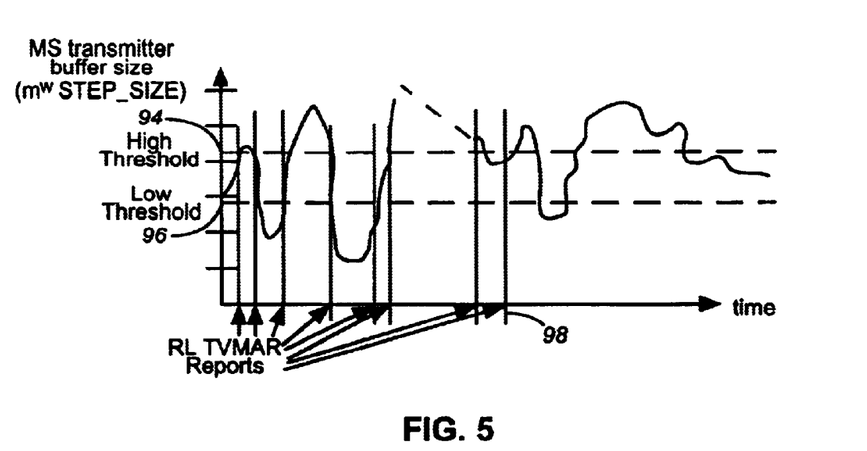
FIG. 5 illustrates a representation, similar to that shown in FIG. 4, but here of an embodiment of the present invention in which the reports are generated upon the occurrence of triggering events.

FIG. 5 illustrates an analogous representation of the number of packets buffered at the mobile station, again as a function of time. Here, the reports generated at the mobile station are generated responsive to triggering events. Here, the triggering events are the number of packets buffered exceeding a high threshold 94 or being less than a low threshold 96. The reports are generated responsive to occurrence of such triggering events, here indicated by the segments 98.

To prevent "ping-pong" reporting, that is, too frequent reporting occurrences when the buffer size changes too significantly in too short of a period of time, the generation of the report can be delayed for a selected time period. To ensure that the threshold is exceeded for at least such time period prior to the generation of the report.

The TVMAR, or other appropriate, report is of alternate variance. A full report and a differential report. A full report includes values of complete status and statistics while the differential report reports on a different syndication of buffer usage between a current status and a previous status. This indication is also used as a reverse link data rate request indication to the base station, i.e., to increase or to decrease the data rate at which the packets are communicated with the mobile station.

The differential report forms a single bit feedback generated by the mobile station and transmitted to the base transceiver station while the full report forms a multiple-bit feedback report. The report mechanism is provided by way of a reverse link physical layer signaling, i.e., the report information is imbedded in the physical-layer data frame. Use of the physical layer through which to communicate the report best ensures the delivery of the report in a timely manner. The differential and full reports can be carried by way of the same, or different, channels. If both of the reports are sent by way of the same channel, the coding rate of the channel should be adjusted accordingly. And, if the reports are sent by way of different channels, synchronization amongst the reports is necessary. The full TVMAR report can also be sent as a cdma2000 reverse link layer-3 message or alternately, the report can be included in the REQ_BLOB field of a supplemental channel request message (SCRM) or a supplemental channel request mini message (SCRMM).

The following illustrates an exemplary TVMAR_BLOB report message format.

| Field | Length (bits) |
|---|---|
| TIME_INTERVAL | 3 |
| NUM_SRID | 3 |
| REVERVED | 2 |

Followed by NUM_SRID occurrences of the following TVMAR parameters per service instance

| | | |
|---|---|---|
| | SR_ID | 3 |
| | INSTANTANEOUS_BUFFER | 4 |
| | AVERAGE_BUFFER | 4 |
| | BUFFER_VARIANCE | 4 |
| | RESERVED | 2 |

TIME_INTERVAL—The mobile station shall set this field to the interval in the number of 20 ms intervals during the measurement period.
NUM_SRID—The mobile station shall set this field to the number of Service instances in the TVMAR_BLOB.
RESERVED—The mobile station shall set this field to '00'.
SR_ID—The mobile station shall set this field to the service instance ID.
INSTANTANEOUS_BUFFER—The mobile station shall set this field to the instantaneous buffer usage in the unit of 16 kbps.
AVERAGE_BUFFER—The mobile station shall set this field to the average buffer usage in the unit of 16 kbps.
BUFFER_VARIANCE—The mobile station shall set this field to the buffer usage variance in the unit of 16 kbps.
RESERVED—The mobile station shall set this field to '00'.

In one implementation, a series of differential reports are generated and thereafter a full report is generated. And, the length of the full report period, i.e., the times between generation of the full report is a selectable value. The report period for the differential report is one or more of R-SCH subframes. And, a subframe of an R-SCH forms, for instance, a power control group (PCG).

Figure 6:
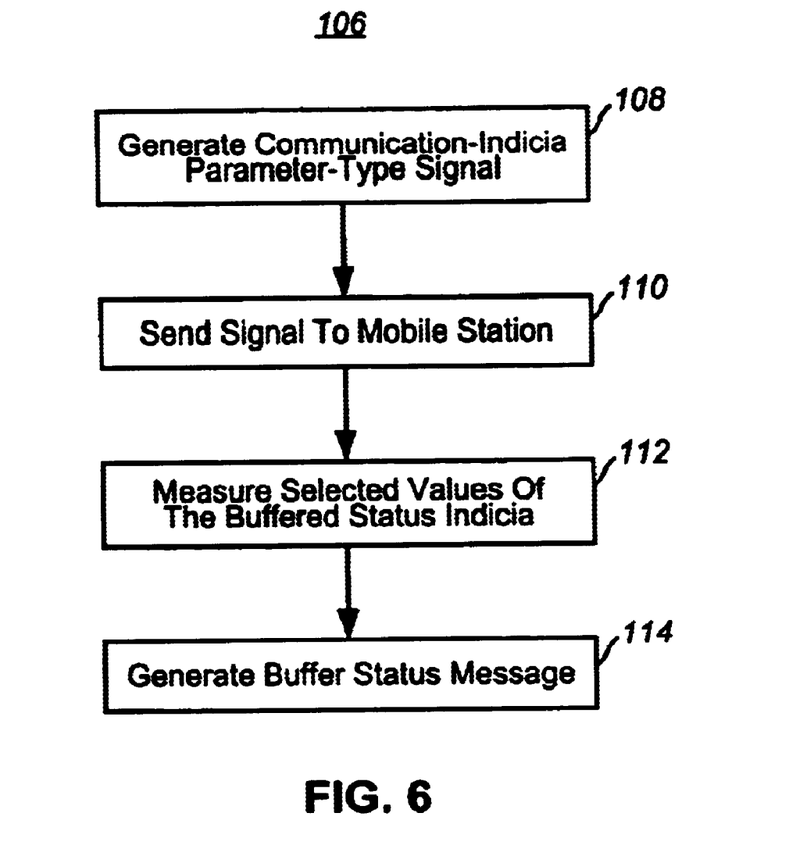
FIG. 6 illustrates a method flow diagram listing the method of operation of an embodiment of the present invention.

FIG. 6 illustrates a method, shown generally at 106, by which the facilitate reporting of communication indicia associated with a mobile station operable in a radio communication system that provides for packet-based communication services.

First, and as indicated by the block 108, a communication-indicia parameter-type signal is generated for communication to the mobile station. The signal contains values representative of selected values of buffer status indicia that are to be measured at the mobile station. The signal is sent, indicated by the block 110, to the mobile station to be detected thereat.

Thereafter, and as indicated by the block 112, selected values of the buffer status indicia are measured. And, as indicated by the block 114, a buffer status message is generated for communication to the network part to report on buffering of the data at the mobile station buffer.

Because the mobile station is instructed as to what parameters are to be measured and reported back for purposes of packet scheduling, improved packet scheduling is possible.

The preceding descriptions are of preferred examples for implementing the invention, in order to make its practice and application clear to one of ordinary skill in the art. The scope of the invention, however, should not necessarily be limited by this description. Rather, the scope of the present invention is defined by the following claims.

What is claimed is:

1. In a radio communication system having a mobile station operable to communicate with a network part of the radio communication system, an improvement of apparatus for the mobile station for reporting to the network part communication indicia associated with the mobile station pursuant to a high-data-rate communication service, said mobile-station apparatus comprising:

a communication indicia parameter detector for detecting network-provided communication-indicia parameters sent to the mobile station, the network-provided communication-indicia parameters identifying parameter-types, measured values the network-provided communication-indicia parameters to be subsequently reported to the network part, the parameter-types of the network-provided communication-indicia parameters identifying at least a selected one of a first parameter-type and at least a second parameter-type;

a communication indicia measurer coupled to said communication indicia parameter detector, said communication indicia measurer for measuring values of the communication indicia parameters of the at least the selected one of the first and at least second parameter-types, respectively, identified by the network-provided communication-indicia parameters sent to the mobile station and detected by said communication indicia parameter detector; and a communication indicia reporter coupled to said communication indicia measurer, said communication indicia reporter for reporting the values, measured by said communication indicia measurer, of the communication-indicia parameters of the at least the selected one of the first and at least second parameter types to the network part.

2. In the radio communication system of claim 1, a further improvement of apparatus for the network part for facilitating the reporting by the mobile station of the values of the communication indicia, said network-part apparatus comprising:

a communication-indicia parameter-type signal generator selectably operable for generating a communication-indicia parameter-type signal, for communication to the mobile station, the communication-indicia parameter-type signal containing the network-provided communication-indicia parameters of the at least the selected one of the first and at least second parameter-types that said communication indicia parameter detector detects.

3. The mobile-station apparatus of claim 2 wherein the mobile station comprises a mobile-station buffer for buffering data prior to communication thereof to effectuate the communication service, and wherein the network-provided communication indicia parameters, which identify the parameter-types and are contained in the communication-indicia parameter-type signal generated by said communication-indicia parameter-type signal generator, comprise buffer-status-related indicia.

4. The apparatus of claim 3 wherein the buffer-status-related indicia comprises instantaneous buffer status indicia.

5. The mobile-station apparatus of claim 3 wherein the buffer-status-related indicia comprises average buffer status indicia.

6. The mobile-station apparatus of claim 3 wherein the buffer-status-related indicia comprises usage variance indicia.

7. In a radio communication system having a mobile station operable to communicate with a network part of the radio communication system, an improvement of apparatus for the mobile station for reporting to the network part communication indicia associated with the mobile station pursuant to a data communication service, data communicated by the mobile station to the network part to effectuate the data communication service buffered at a mobile station buffer prior to communication to the network part, said apparatus comprising:
  a buffer status measurer coupled at least to receive indications of a buffer status indicia, said buffer status measurer for measuring selected values of the buffer status indicia, the buffer status indicia of an indicia-type identified by the network part in a signal transmitted to the mobile station, the indicia-type at least a selected one of a first indicia-type and at least a second indicia-type; and
  a buffer status message generator coupled to said buffer status measurer, said buffer status message generator for generating a buffer status message for communication to the network part to report the selected values measured by said buffer status measurer.

8. The apparatus of claim 7 wherein the buffer status message generated by said buffer status message generator comprises a multibit value.

9. The apparatus of claim 7 wherein the selected values measured by said buffer status measurer are measured at a first time and at least a second time and wherein the buffer status message generated by said buffer status message generator comprises a differential message of values representative of differences between the selected values measured at the first time and at the second time.

10. The apparatus of claim 9 wherein the differential message generated by said buffer status message generator comprises a single-bit message.

11. The apparatus of claim 7 wherein the buffer status message generated by said buffer status message generator is generated at successive selected intervals.

12. The apparatus of claim 7 wherein said buffer status message generator is further coupled to receive a trigger signal, the trigger signal of a selected value responsive to occurrence of a selected event, and wherein the buffer status message generated by said buffer status message generator is generated upon detection of the trigger signal of the selected value.

13. The apparatus of claim 7 wherein the radio communication system is defined in terms of protocol layers including a physical layer and wherein the buffer status message generated by said buffer status message generator comprises a physical-layer message communicated at the physical layer.

14. The apparatus of claim 7 wherein the radio communication system is defined in terms of protocol layers including a physical layer and at least one higher layer and wherein the buffer status message generated by said buffer status message generator comprises a message generated at the higher layer.

15. The apparatus of claim 14 wherein the at least one higher layer comprises a layer-three and wherein the buffer status message comprises a layer-three message formed at the layer-three layer.

16. The apparatus of claim 14 wherein the radio communication system comprises a cellular communication system operable generally pursuant to a cdma2000 operational specification that provides for 1×EV-DV data services, and wherein the buffer status message generated by said buffer status message generator is used to effectuate reverse-link channel scheduling to allocate reverse link channels to effectuate the 1×EV-DV data services.

17. In a method of communication in a radio communication system having a mobile station operable to communicate with a network part of the radio communication system, an improvement of a method for the mobile station for reporting to the network part communication indicia associated with the mobile station pursuant to a high-data-rate communication service, said method comprising the operations of:
  measuring selected values of buffer status indicia associated with a mobile station buffer embodied at the mobile station, the buffer status indicia of an indicia-type identified by the network part in a signal transmitted to the mobile station, the indicia-type at least a selected one of a first indicia-type and at least a second indicia-type; and
  generating a buffer status message for communication to the network part to report on buffering of data at the mobile station buffer.

18. The method of claim 17 further comprising the operations, prior to said operation of measuring of:
  generating a communication-indicia parameter-type signal for communication to the mobile station, the communication-indicia parameter-type signal containing values representative of the selected values of buffer status indicia identifying the selected one of the first and at least second indicia-types, respectively, that are to be measured during said operation of measuring; and
  sending the communication-indicia parameter-type signal to the mobile station to be detected thereat.

19. The method of claim 18 further comprising the operation of:
  detecting the values that identify the selected one of the first and at least second indicia-types contained in the communication-indicia parameter-type signal sent to the mobile station; and
  wherein the selected values measured during said operation of measuring are selected responsive to the values contained in the communication-indicia parameter-type signal.

20. The method of claim 17 further comprising the operation of reporting values measured during said operation of measuring to the network part.

* * * * *